United States Patent [19]

Green

[11] Patent Number: 5,353,880
[45] Date of Patent: Oct. 11, 1994

[54] FLAME EXTINGUISHER SYSTEM FOR A BARBECUE

[76] Inventor: Carroll D. Green, 193 High St., Wakefield, R.I. 02879

[21] Appl. No.: 116,580

[22] Filed: Sep. 3, 1993

[51] Int. Cl.⁵ .............................................. A62C 3/00
[52] U.S. Cl. ........................................ 169/65; 169/13; 169/18; 126/41 R
[58] Field of Search ............... 169/69, 13, 18, 33, 169/9; 126/41 R, 25 R

[56] References Cited

U.S. PATENT DOCUMENTS

| | | | |
|---|---|---|---|
| 890,155 | 6/1908 | Mastin | 169/33 X |
| 2,061,379 | 11/1936 | Hudson | 169/33 |
| 2,132,132 | 10/1938 | Seat | 169/13 |
| 3,610,225 | 10/1971 | Schwantes . | |
| 3,889,738 | 6/1975 | Murphy . | |
| 3,967,613 | 7/1976 | Rybak et al. | 126/41 R |
| 4,043,312 | 8/1977 | Kern | 126/41 R |
| 4,167,175 | 9/1979 | Malafouris . | |
| 4,483,314 | 11/1984 | Parker, Jr. et al. . | |
| 4,580,638 | 4/1986 | Jones et al. . | |
| 4,630,593 | 12/1986 | Gremillion . | |
| 4,632,089 | 12/1986 | Wardell | 126/41 R X |
| 4,830,114 | 5/1989 | Jessick et al. | 169/26 |
| 5,031,702 | 7/1991 | Trumbach | 169/13 X |
| 5,111,803 | 5/1992 | Barker et al. . | |
| 5,127,479 | 7/1992 | Stehling et al. . | |

FOREIGN PATENT DOCUMENTS 756889 7/1939 Fed. Rep. of Germany ........ 169/30

Primary Examiner—David M. Mitchell
Assistant Examiner—Gary C. Hoge
Attorney, Agent, or Firm—Richard C. Litman

[57] ABSTRACT

A system for extinguishing flames resulting from the ignition of grease dripping from meats cooking on a barbecue grill with a flame extinguishing fluid, preferably water. The fluid is contained in a reservoir supported on the barbecue grill frame. In the preferred embodiment fluid is manually pumped from the reservoir to an apertured discharge conduit within the lower shell of the barbecue grill using an air pump which displaces fluid from the reservoir, forcing the fluid through the apertured conduit and into the grill. An electric fluid pump replaces the air pump in an alternate embodiment.

9 Claims, 4 Drawing Sheets

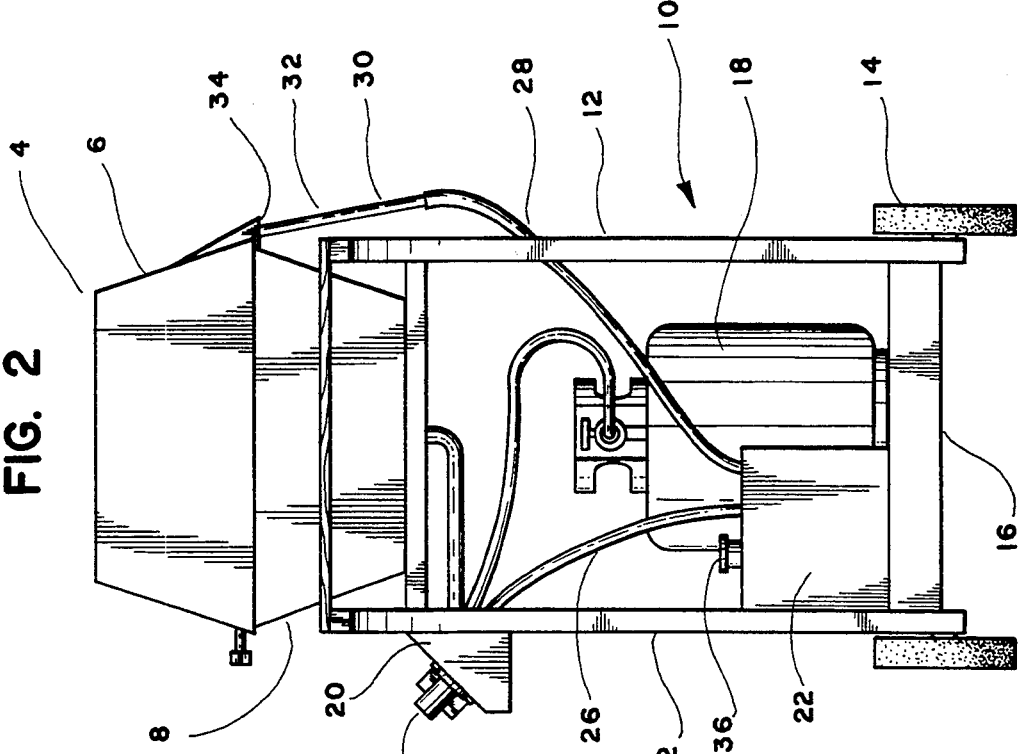
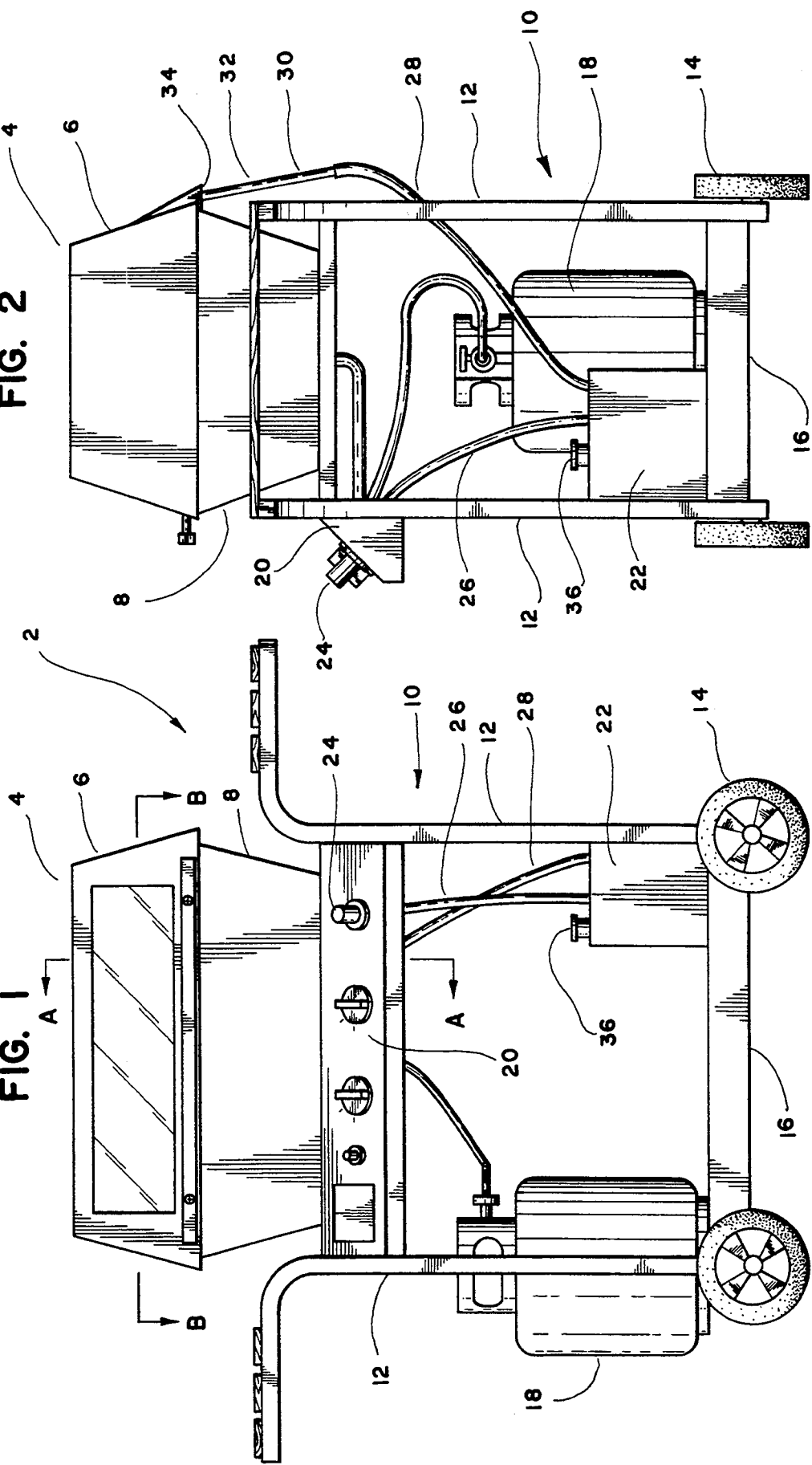

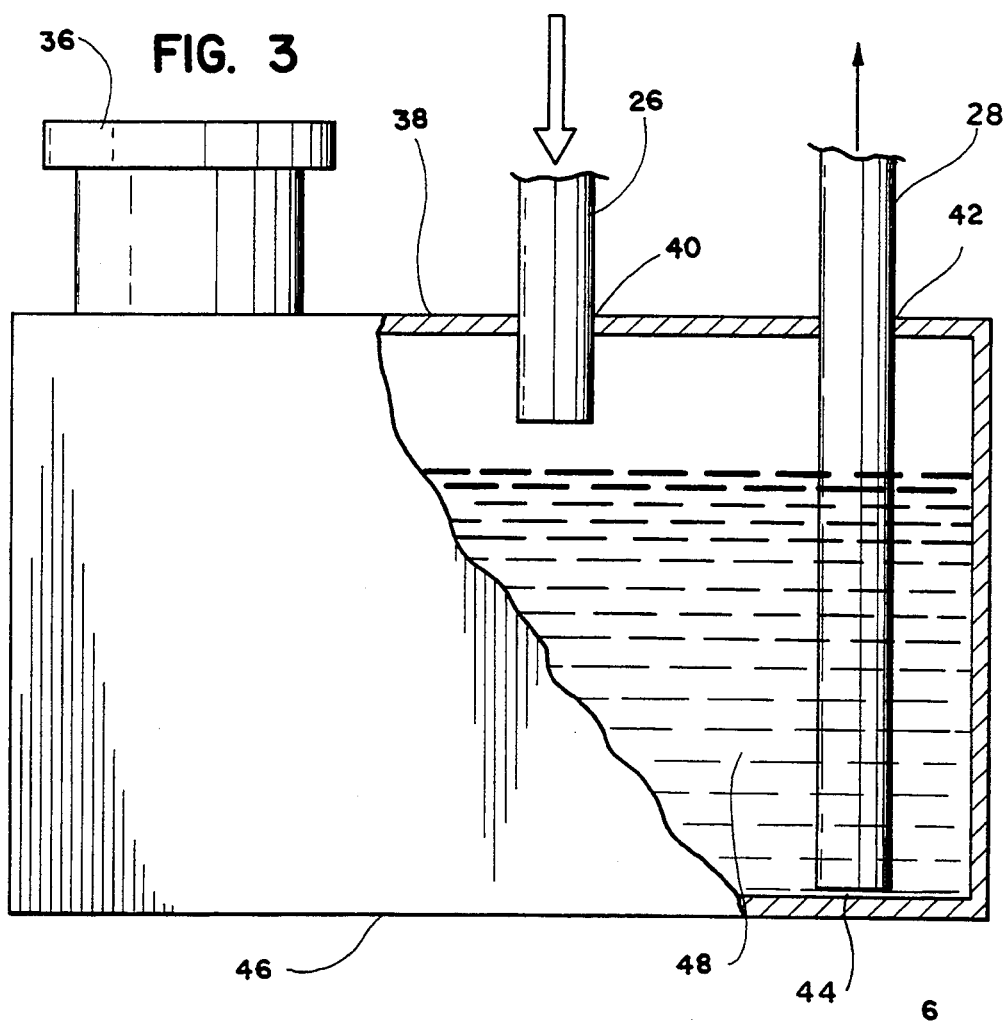
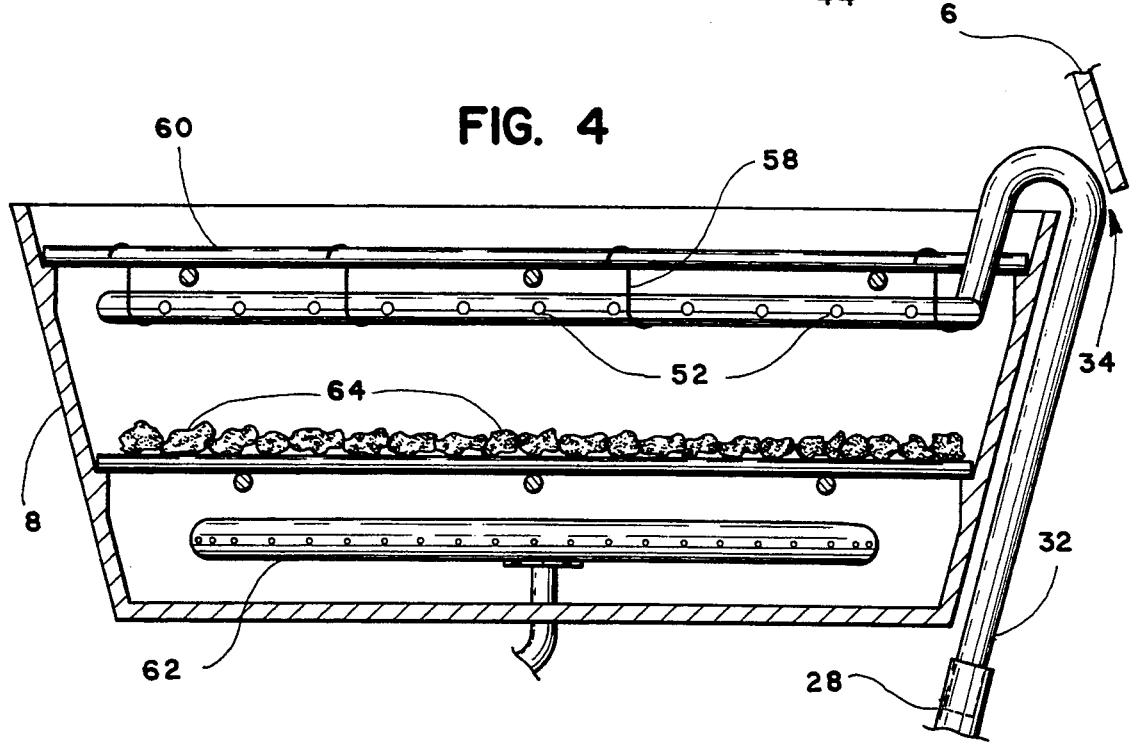

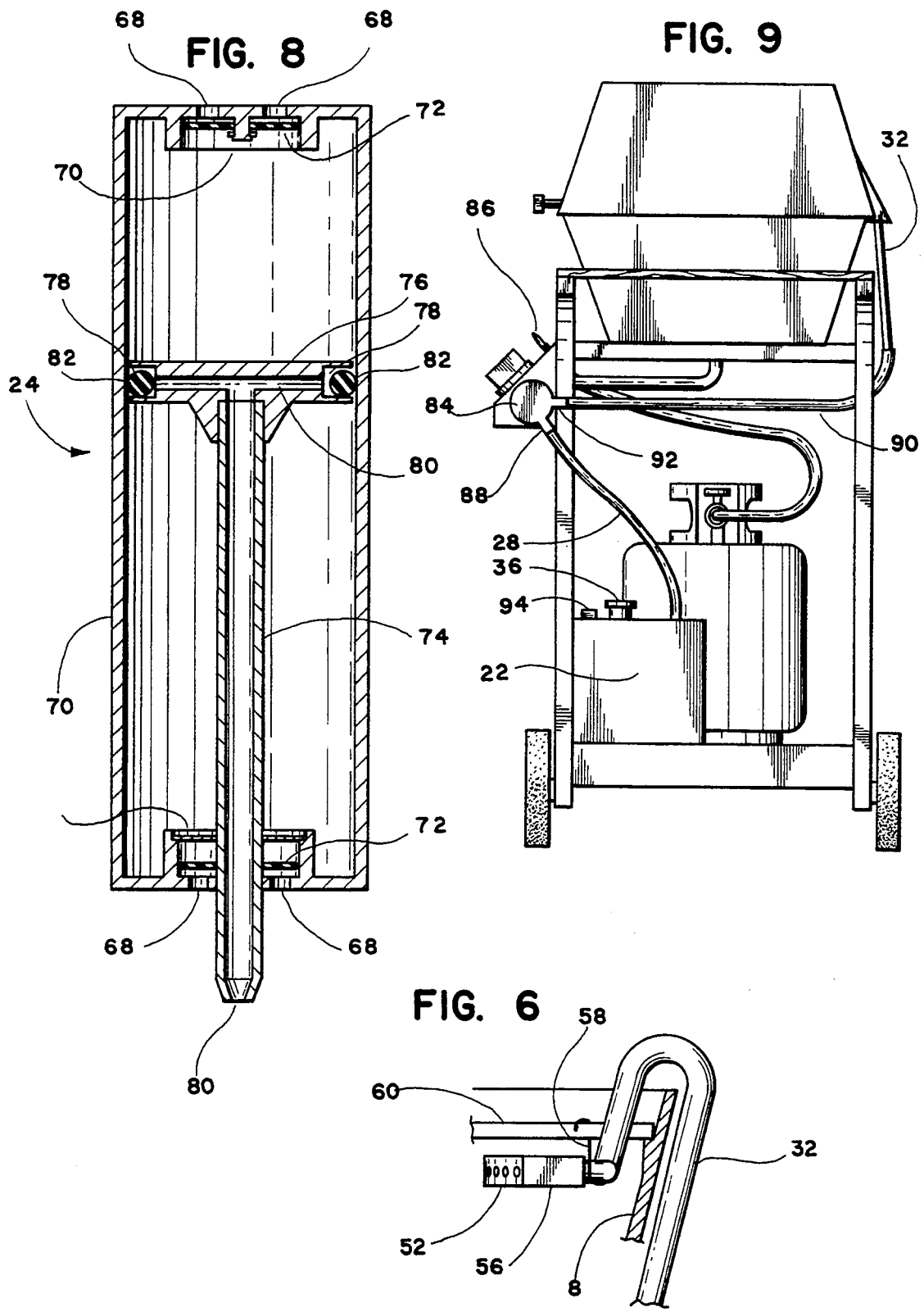

FLAME EXTINGUISHER SYSTEM FOR A BARBECUE

BACKGROUND OF THE INVENTION

1. FIELD OF THE INVENTION

The present invention relates generally to fire extinguishing apparatus. It pertains particularly to a flame extinguishing system suitable for use with a gas barbecue grill which provides a means for extinguishing flames resulting from the ignition of grease dripping from meats cooking thereon.

2. DESCRIPTION OF THE PRIOR ART

One problem associated with the cooking of foods on a conventional gas barbecue grill is the occurrence of often uncontrollable flames resulting from the ignition of grease. It is well known that meat fats drip constantly on lava rocks within the grill. In fact, the smoke generated by these drippings imparts the delicious flavor to foods associated with barbecue cooking. These drippings frequently accumulate and suddenly ignite, causing undesirable burning of foods and conditions potentially hazardous to the person using the grill. One common and inconvenient solution is to shut off the gas supply to the grill, obtain a container of water, extinguish the flames with the water, and then resume cooking after restarting the grill.

The patent record discloses numerous arrangements for extinguishing or reducing undesirable flames emitted from cooking devices such as stoves and barbecue grills. Generally, these devices smother or otherwise deprive a burning fire of oxygen.

U.S. Pat. No. 3,610,225, issued on Oct. 5, 1971 to Merle J. Schwantes, discloses a collapsible, self-extinguishing barbecue grill with a plate which may be disposed upon the grill so as to automatically extinguish the fuel. This apparatus is reputed to be practical for extinguishing burning charcoal briquettes after grilling of foods is complete.

U.S. Pat. No. 3,889,738, issued on Jun. 17, 1975 to John R. Murphy, discloses a fireplace extinguisher providing an airtight chamber or box constructed of flanged panels that can be placed over a fireplace fire, depriving the fire of oxygen and thereby extinguishing the fire.

U.S. Pat. No. 4,167,175, issued on Sep. 11, 1979 to Dannie O. Malafouris, discloses a hibachi grill and an air-tight pouch dimensioned to receive the grill. The folded grill may be placed inside the pouch which is then sealed, denying the burning fire of oxygen thereby extinguishing the fire. This apparatus works sufficiently well as a means for extinguishing burning coals but is not well suited to extinguishing uncontrolled flames.

U.S. Pat. No. 4,483,314, issued on Nov. 20, 1984 to Charles E. Parker et al., discloses an indoor cooking range having a flame-retardant blanket disposed in a compartment immediately below the heating elements of the range. In use, the blanket may be withdrawn from the compartment and placed over the heating elements to smother uncontrolled flames.

U.S. Pat. No. 4,580,638, issued on Apr. 8, 1986 to Wendell M. Jones, discloses a first suppression and control system for a cooking unit having a conventional, chemical, fire retardant discharge system having heat-responsive controls and a hood-supported flexible fire curtain for enclosing the cooking unit. The use of fire-retardant chemicals as a fire suppressor renders the cooking foods inedible since contact between the chemicals and the food is unavoidable.

U.S. Pat. No. 4,630,593, issued on Dec. 23, 1986 to Ernest J. Gremillion, discloses a barbecue grill with a fire retarding screen of a woven, wire mesh suspended below a cooking grill. When used, grease or fat drippings from the meat cooking on the grill are dissipated on contact thereby reducing accumulations of highly combustible materials for later ignition. While lowering the potential for a grease fire to develop, the screen alone provides no means for extinguishing a fire should one occur.

U.S. Pat. No. 5,111,803, issued on May 12, 1992 to James Barker et al., discloses a flare reduction buffer for gas barbecue grills comprising a plate made of heat resistant material formed with perforated pockets. The buffer plate is placed between a burner element and the grilling surface during normal use. This buffer plate may reduce cooking efficiency by limiting convective heat transfer.

U.S. Pat. No. 5,127,479, issued on Jul. 7, 1992 to Henry J. Stehling et al., discloses a fire extinguishing system for indoor stoves and ranges which includes a fire extinguisher mounted in a cabinet positioned over the stove or range. The extinguisher is activated by the melting of a fusible link mounted in a hood positioned between the fire extinguisher and the stove top.

None of the above inventions and patents, taken either singly or in combination, is seen to describe the instant invention as claimed.

SUMMARY OF THE INVENTION

There has long been a need for a device of uncomplicated construction which can be used to effectively extinguish the uncontrollable flames resulting from the ignition of grease in a barbecue grill which occur from time to time. Accordingly, it is a principal object of the invention to provide a flame extinguishing system for use with a gas barbecue grill that utilizes a flame extinguishing fluid, preferably liquid water, to extinguish flames resulting from the ignition of grease from meat fats dripping on lava rocks within the grill.

It is another object of the invention to provide a flame extinguishing system for use with a gas barbecue grill providing a reservoir in fluid communication with a discharge conduit and a means for delivering a flame extinguishing fluid to the lava rocks of a barbecue grill.

It is a further object of the invention to provide a flame extinguishing system for use with a gas barbecue grill providing a fluid discharge conduit constructed of a heat resistant material.

Still another object of the invention is to provide a flame extinguishing system for use with a gas barbecue grill providing a fluid discharge conduit having at its distal end a plurality of apertures for dispensing a flame extinguishing fluid into the lower shell of a barbecue grill.

It is yet another object of the invention is to provide a flame extinguishing system for use with a gas barbecue grill providing a fluid discharge conduit that is suspended by S-type hooks from a wire grill within the lower shell of a barbecue grill.

It is still a further object of the invention to provide a flame extinguishing system for use with a gas barbecue grill providing an air pump for delivering a flame extinguishing liquid having a compression stroke in either direction of piston displacement.

It is still a further object of the invention to provide a flame extinguishing system for use with a gas barbecue grill having an electric fluid pump for delivering a flame extinguishing liquid.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a front elevational view of a portable gas barbecue grill in combination with a flame extinguishing system in accordance with the present invention.

FIG. 2 is a side elevational view of the portable gas barbecue grill and flame extinguishing system of FIG. 1.

FIG. 3 is a side elevational view with a portion broken away to show detail of a fluid reservoir showing the arrangement of an fluid inlet tube and a fluid outlet tube inside the tank.

FIG. 4 is a section view of the lower shell of the barbecue grill drawn along lines A—A of FIG. 1 showing the preferred embodiment of the fluid discharge conduit.

FIG. 6 is a section view of the lower shell of the barbecue grill drawn along lines A—A of FIG. 1 showing a second embodiment of the fluid discharge conduit having fan shaped nozzles.

FIG. 8 is a sectional view of the preferred embodiment of an air pump.

FIG. 9 is a side elevational view of the portable gas barbecue grill having an electric water pump.

Similar reference characters denote corresponding features consistently throughout the attached drawings.

DETAILED DESCRIPTION OF THE PREFERRED EMBODIMENTS

Figure 5:
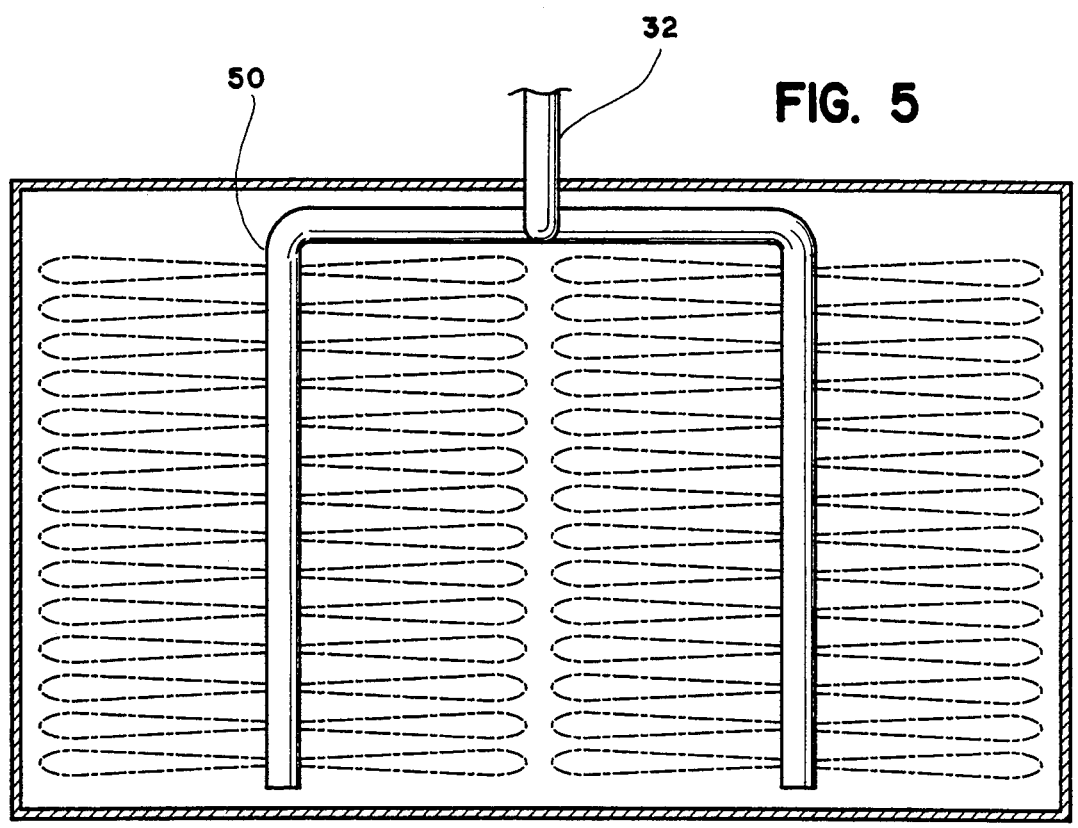
FIG. 5 is a partially sectional top view of the lower shell of the barbecue grill drawn along lines B—B of FIG. 1 showing the arrangement of a U-shaped fluid discharge conduit of the preferred embodiment.

Referring now in detail to the drawings, FIG. 1 illustrates a barbecue grill 2 having a firebox 4 with an upper shell 6 forming the lid which may be pivotally attached to a lower shell 8. The lower shell 8 is supported by an upright frame 10 including: four vertical legs 12, four wheels 14 each attached to the bottom of a single leg, a platform 16 joined to the legs 12 for supporting a gas canister 18, and a control panel 20. Also supported on the frame 10 is a fluid reservoir 22 for containing a flame extinguishing fluid, preferably liquid water, and an air pump 24 for driving the flame extinguishing fluid from the reservoir 24. A flexible fluid inlet tube 26 serves as a conduit for air forced by the air pump 24 into the reservoir 22 while a flexible fluid outlet tube 28 serves as a conduit between said reservoir 22 and a proximal end 30 of a fluid discharge conduit 32, thereby placing the fluid discharge conduit 32 in fluid communication with the reservoir 22. Air pumped into reservoir 22 displaced the flame extinguishing fluid within the reservoir 22 forcing the fluid to pass through the fluid outlet tube 28, into the fluid discharge conduit 32.

FIG. 2 illustrates another view of the barbecue grill 2 showing the proximal end 30 of the fluid discharge conduit 32 preferably entering the lower shell 8 of the barbecue grill 2 through a rear smoke vent 34.

FIG. 3 illustrates the fluid reservoir 22 having a removable cap 36 attached by threads (not shown) to the reservoir 22 resulting in an air-tight seal between the reservoir 22 and the cap 36. Further, the reservoir 22 includes an upper wall portion 38 having apertures 40 and 42 of a sufficient size for providing a friction fit with the fluid inlet tube 26 and the fluid outlet tube 28. The fluid inlet and outlet tubes, respectively 26 and 28, are preferably of similar interior and exterior diameters. It is contemplated that tubes of different diameters may be employed without altering the overall utility of the present invention. The proximal end 44 of the fluid outlet tube 28 extends to such a depth within the reservoir 22 that the bottom wall 46 thereof is closely approached. At all times the proximal end 44 of the fluid outlet tube 28 remains below the surface of the fluid 48 within the reservoir 22. In this fashion, the maximum volume of fluid 48 is available for flame extinguishing purposes as pressurized air delivered from the fluid inlet tube 26 drives the flame extinguishing fluid 48 from the reservoir 22.

One embodiment of the fluid discharge conduit 32, constructed of a heat resistant material such as steel or aluminum, is shown in FIGS. 4 and 5. The distal end of the fluid outlet tube 28, constructed of flexible plastic, engages the proximal end of the fluid discharge conduit 32 by means of a slip fit. The fluid discharge conduit 32 preferably enters the lower shell 8 of the barbecue grill 2 through a rear smoke vent 34 and has at its distal end a hollow U-shaped portion 50. The U-shaped portion 50 has a plurality of apertures 52 through which the flame extinguishing fluid may be dispensed into the lower shell 8.

Figure 7:
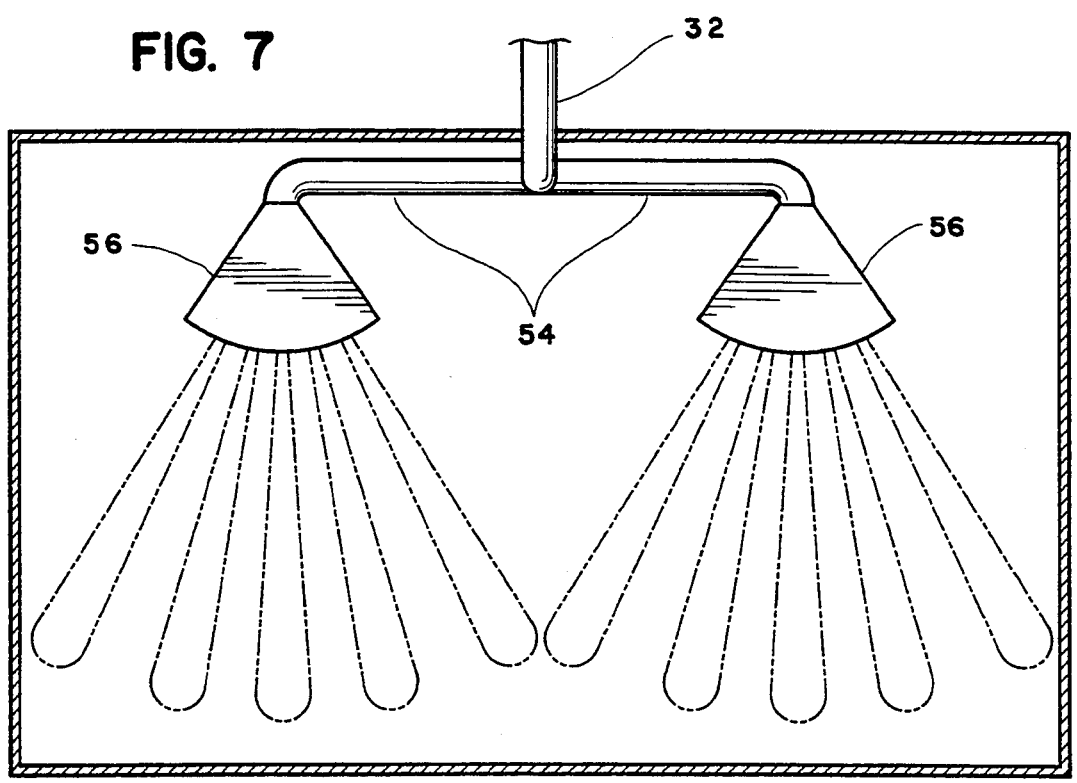
FIG. 7 is a partially sectional top view of the lower shell of the barbecue grill along lines B—B of FIG. 1 showing a second embodiment of the fluid discharge conduit having fan shaped nozzles.

In an alternate embodiment of the fluid discharge conduit 32, shown in FIGS. 6 and 7, the fluid discharge conduit 32 has at its distal end branching portions 54, each having a separate, fan shaped nozzle 56 attached thereto. Each nozzle 56 may be seen to be multi-apertured, having a number of regularly arranged bores or apertures 52 through which the flame extinguishing fluid may be dispensed into the lower shell 8.

FIGS. 4 and 6, in addition, illustrate the use of a plurality of S-type hooks 58 used for suspending either embodiment of the fluid discharge conduit 32 from a wire, grill member 60. The grill member, normally disposed within the lower shell 8 in a position above a gaseous fuel burning element 62 and lava rocks 64, provides a support for foods during cooking.

FIG. 8 illustrates the air pump 24 of the preferred embodiment provided for delivering the flame extinguishing fluid from the reservoir to the lower shell of the barbecue grill. A cylindrical housing 66 of the pump has circular air inlets or openings 68 at each of its ends. One-way valves 70 positioned adjacent each inlet are retained within the housing 66 so as to allow air to enter the housing 66 through the inlets 68 but not allow air to exit. Each valve includes a thin, resilient disk 72 capable of seating against and disengaging from the inlets 68. A hollow tubular shaft 74, adapted to be attached to the control panel 20 on the grill frame 10, enters one end of the housing 66. A cylindrical piston 76 is secured to one end of the shaft 74 and has a diameter somewhat smaller than the inside diameter of the housing 66. The piston 76 also has an annular groove 78 and a diametric aperture 80 drilled through the piston 76 creating an airway from the housing interior through the piston 76 and into the shaft 74. An O-ring 82 fitted about the periphery of piston 76 acts as a sealing member between the housing 66 and the piston 76 is disposed within the annular groove 78 of the piston 76 and has an outer diameter substantially the same as the inner diameter of the housing 66. The width or thickness of the ring is somewhat less than the width of the annular groove 78, when the piston 76 reciprocates relative to the pump housing 66 the O-ring 82 shifts in such a fashion to direct air into the diametric aperture 80 regardless of displacement direction. The air pump 24 is thus double-acting, having a compression stroke in either direction of housing displacement. With the shaft 74 and piston 76 remaining in a fixed position relative to the barbecue grill frame 10, the user grasps the pump housing 66 and applies the necessary reciprocating movement to the housing exterior to operate the air pump 24 and drive air to the reservoir 22.

With the pump housing 66 being reciprocated, a volume of air is forced into the reservoir 22. The air travels from the air pump 24 via the fluid inlet tube 26 and drives a volume of flame extinguishing fluid from the reservoir 22, through the fluid outlet tube 28, into the fluid discharge conduit 32 and through its apertures 52, and into the lower shell 8 of the barbecue grill 2. The flame extinguishing fluid splashes upon the lava rocks 64 and extinguishes flames caused by the ignition of grease collected thereon.

FIG. 9 illustrates an alternate embodiment of the invention having an electric fluid pump 84 replacing the air pump of the preferred embodiment. This pump may be of the type including a positive displacement piston or, alternatively, having a centrifugal fluid displacement mechanism. Power to this pump is provided by either an A.C. or D.C. source (not shown). The electric pump 84 is controlled by a electric switch 86 mounted on the control panel 20 of the barbecue grill 2. The electric fluid pump 84 is secured to the upright frame 10 of the barbecue grill 2. The inlet 88 of the pump attaches to the fluid outlet tube 28 leading from the reservoir. A second fluid outlet tube 90 connects the outlet 92 of the pump to the fluid discharge conduit 32. As fluid is drawn from the reservoir 22 by the electric pump 84, air enters the reservoir 22 through a vent 94.

It is to be understood that the present invention is not limited to the several embodiments described above, but encompasses any and all embodiments within the scope of the following claims.

I claim:

1. A barbecue grill in combination with a flame extinguishing system, comprising:
    (a) a firebox having a lower shell;
    (b) an upright frame supporting the lower shell of the firebox;
    (c) a reservoir for containing a flame extinguishing fluid, said reservoir being supported on the upright frame;
    (d) a fluid discharge conduit, said conduit having an inlet end in fluid communication with the reservoir and a distal end disposed within said lower shell; and,
    (e) means for delivering the flame extinguishing fluid from the reservoir to said distal end of said fluid discharge conduit, whereby said flame extinguishing fluid is delivered into said lower shell.

2. The barbecue grill in combination with a flame extinguishing system according to claim 1, wherein said fluid discharge conduit is constructed of a heat resistant material.

3. The barbecue grill in combination with a flame extinguishing system according to claim 1, wherein said fluid discharge conduit includes at its distal end a U-shaped portion, said U-shaped portion having a plurality of apertures therein for the even distribution of the flame extinguishing fluid.

4. The barbecue grill in combination with a flame extinguishing system according to claim 1, wherein said fluid discharge conduit includes at least one multi-apertured nozzle attached to its distal end.

5. The barbecue grill in combination with a flame extinguishing system according to claim 1, wherein said firebox includes a wire grill member disposed within said lower shell, and said combination further comprises: at least one S-type hook suspending said fluid discharge conduit from said wire grill member.

6. A flame extinguishing system for a barbecue grill comprising:
    (a) a reservoir for containing a flame extinguishing fluid;
    (b) an air pump in fluid communication with said reservoir, said air pump adapted to be attached to a supporting surface remote from said reservoir; said air pump including
        a reciprocating housing having opposing air inlets at each end thereof,
        a one-way valve positioned adjacent each said air inlet for allowing air to enter, but not exit, said housing,
        a piston fitted within said housing for reciprocation relative thereto, and
        a hollow shaft joined to said piston, adapted for mounting to a supporting surface, for retaining said piston in a fixed position relative to said supporting surface and conveying compressed air from within said housing toward said reservoir; and
    (c) a fluid discharge conduit in fluid communication with said reservoir for delivering the flame extinguishing fluid from said reservoir into the barbecue grill.

7. A flame extinguishing system for a barbecue grill according to claim 6, wherein said piston further includes:
    an O-ring fitted within an annular groove about the periphery of the piston for providing a substantially air-tight fit between said housing and said piston.

8. A flame extinguishing system for a barbecue grill comprising:
    (a) a reservoir for containing a flame extinguishing fluid;
    (b) an air pump in fluid communication with said reservoir, said air pump adapted to be attached to a supporting surface remote from said reservoir;
    (c) a fluid discharge conduit in fluid communication with said reservoir for delivering the flame extinguishing fluid from said reservoir into the barbecue grill; and
    (d) at least one S-type hook engaged with said fluid discharge conduit for suspending said fluid discharge conduit from a supporting surface.

9. A flame extinguishing system for a barbecue grill comprising:
(a) a reservoir for containing a flame extinguishing fluid;
(b) an air pump in fluid communication with said reservoir, said air pump adapted to be attached to a supporting surface remote from said reservoir;
(c) a fluid discharge conduit in fluid communication with said reservoir for delivering the flame extinguishing fluid from said reservoir into the barbecue grill, said fluid discharge conduit includes at its distal end a U-shaped portion, said U-shaped portion having a plurality of apertures therein for the even distribution of the flame extinguishing fluid.

* * * * *